US010065382B2

(12) United States Patent
Mancini et al.

(10) Patent No.: US 10,065,382 B2
(45) Date of Patent: *Sep. 4, 2018

(54) PROCESS AND APPARATUS FOR ASSEMBLING TYRES

(71) Applicant: Pirelli Tyre S.p.A., Milan (IT)

(72) Inventors: Gianni Mancini, Milan (IT); Maurizio Marchini, Milan (IT); Gaetano Lo Presti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 75 days.

This patent is subject to a terminal disclaimer.

(21) Appl. No.: 14/625,352

(22) Filed: Feb. 18, 2015

(65) Prior Publication Data

US 2015/0158261 A1    Jun. 11, 2015

Related U.S. Application Data

(62) Division of application No. 13/000,599, filed as application No. PCT/IB2008/051501 on Apr. 18, 2008, now Pat. No. 8,986,480.

(51) Int. Cl.
*B29D 30/36* (2006.01)
*B29D 30/20* (2006.01)
(Continued)

(52) U.S. Cl.
CPC ......... *B29D 30/20* (2013.01); *B29D 30/2607* (2013.01); *B29D 30/36* (2013.01);
(Continued)

(58) Field of Classification Search
CPC .... B29D 30/245; B29D 30/246; B29D 30/36; B29D 2030/086; B29D 2030/105; B29D 2030/202; B29D 2030/523
See application file for complete search history.

(56) References Cited

U.S. PATENT DOCUMENTS 2,818,907 A    1/1958  Sapp
3,580,782 A    5/1971  LeBlond
(Continued)

FOREIGN PATENT DOCUMENTS

CN    1198708 A    11/1998
CN    1646300 A    7/2005
(Continued)

OTHER PUBLICATIONS

Machine generated English language translation of JP 2006-297778 (original document dated Nov. 2006).*
(Continued)

*Primary Examiner* — Martin K Rogers
(74) *Attorney, Agent, or Firm* — Finnegan, Henderson, Farabow, Garrett & Dunner, L.L.P.

(57) ABSTRACT

In an assembly station a carcass sleeve and an outer sleeve manufactured along respective building ones are mutually coupled. Integrated into the assembly station are engagement devices that can be alternatively coupled to an auxiliary drum carrying an outer sleeve and to a building drum carrying a carcass sleeve. A grip unit picks up the outer sleeve from the auxiliary drum associated with the engagement devices in order to position it to a location radially external to the carcass sleeve carried by the building drum associated with the engagement devices in place of the auxiliary drum. Shaping devices that can be operatively coupled to the building drum cause radial expansion of the carcass sleeve so as to enable the latter to be coupled to the outer sleeve retained by the grip unit.

9 Claims, 5 Drawing Sheets

(51) Int. Cl.
*B29D 30/26* (2006.01)
*B29D 30/24* (2006.01)

(52) U.S. Cl.
CPC .. *B29D 2030/202* (2013.01); *B29D 2030/241* (2013.01); *B29D 2030/2657* (2013.01)

(56) References Cited

U.S. PATENT DOCUMENTS

| | | | | |
|---|---|---|---|---|
| 3,687,756 A | * | 8/1972 | Appleby | B29D 30/2607 156/111 |
| 3,740,292 A | | 6/1973 | LeBlond | |
| 3,775,220 A | | 11/1973 | Rattray | |
| 3,790,425 A | | 2/1974 | Leblond | |
| 3,865,670 A | * | 2/1975 | Habert | B29D 30/2607 156/126 |
| 3,922,187 A | * | 11/1975 | De Nardis | B29D 30/36 156/415 |
| 4,039,366 A | * | 8/1977 | Yabe | B29D 30/2607 156/126 |
| 4,314,864 A | * | 2/1982 | Loeffler | B29D 30/0016 156/111 |
| 4,443,290 A | * | 4/1984 | Loeffler | B29D 30/0016 156/111 |
| 4,474,399 A | * | 10/1984 | Lauber | B29D 30/0016 156/406.2 |
| 4,634,357 A | * | 1/1987 | Brewer | B29D 30/542 156/397 |
| 5,051,149 A | | 9/1991 | Ishii | |
| 5,066,354 A | * | 11/1991 | Benjamin | B29D 30/24 279/2.13 |
| 5,354,404 A | * | 10/1994 | Benjamin | B29D 30/005 156/123 |
| 5,490,897 A | * | 2/1996 | Miyanaga | B29D 30/245 156/415 |
| 5,635,016 A | * | 6/1997 | Byerley | B29D 30/242 156/406.2 |
| 5,948,207 A | * | 9/1999 | Huisman | B29D 30/20 156/396 |
| 6,328,084 B1 | | 12/2001 | Caretta et al. | |
| 6,635,132 B2 | * | 10/2003 | Caretta | B29D 30/0016 156/111 |
| 7,384,499 B2 | | 6/2008 | Girard et al. | |
| 2004/0261934 A1 | | 12/2004 | Nakata et al. | |
| 2005/0161162 A1 | | 7/2005 | Bakos et al. | |
| 2005/0224159 A1 | | 10/2005 | Suda et al. | |
| 2005/0252611 A1 | | 11/2005 | Girard et al. | |
| 2006/0037708 A1 | * | 2/2006 | Mihalik | B29D 30/28 156/394.1 |
| 2006/0144500 A1 | | 7/2006 | Lacagnina | |
| 2007/0175567 A1 | | 8/2007 | Stahl | |
| 2007/0284029 A1 | | 12/2007 | Lacagnina | |
| 2009/0155399 A1 | * | 6/2009 | Fujieda | B29C 35/16 425/58.1 |
| 2009/0160096 A1 | | 6/2009 | Currie et al. | |
| 2010/0000685 A1 | * | 1/2010 | Takatsuka | B29D 30/26 156/415 |
| 2011/0126962 A1 | * | 6/2011 | Mancini | B29D 30/20 156/110.1 |

FOREIGN PATENT DOCUMENTS

| | | | | |
|---|---|---|---|---|
| DE | 2705504 | * | 8/1978 | B29H 17/16 |
| EP | 0 104 338 A1 | | 4/1984 | |
| EP | 1 211 057 A2 | | 6/2002 | |
| EP | 1 312 462 A1 | | 5/2003 | |
| EP | 1 481 791 A2 | | 12/2004 | |
| EP | 1 491 324 A2 | | 12/2004 | |
| JP | 60-220736 | | 11/1985 | |
| JP | 06-210762 | * | 8/1994 | B29D 30/08 |
| JP | 2001-232693 | * | 8/2001 | B29D 30/24 |
| JP | 2002-532285 | * | 10/2002 | B29D 30/10 |
| JP | 2006-248163 | * | 9/2006 | B29D 30/32 |
| JP | 2006-29778 | * | 11/2006 | B29D 30/16 |
| JP | 2006-297778 | | 11/2006 | |
| RU | 2 174 469 C2 | | 2/1997 | |
| RU | 2 302 341 C2 | | 4/2003 | |
| RU | 2005 117 151 A | | 10/2003 | |
| SU | 1 729 787 A1 | | 4/1990 | |
| WO | WO 97/28957 | | 8/1997 | |
| WO | WO 01/36185 A1 | | 5/2001 | |
| WO | WO 02/094545 A1 | | 11/2002 | |
| WO | WO 03/084737 A1 | | 10/2003 | |
| WO | WO 2004/041520 A1 | | 5/2004 | |
| WO | WO 2004/041521 A1 | | 5/2004 | |
| WO | WO 2006/064526 A1 | | 6/2006 | |
| WO | WO 2007/074482 A1 | | 7/2007 | |
| WO | WO 2007/135706 | * | 11/2007 | B29D 30/26 |
| WO | WO 2008/099236 | | 8/2008 | |
| WO | WO 2008/099363 | | 9/2008 | |

OTHER PUBLICATIONS

Machine generated English language translation of JP H06-210762 (original document dated Aug. 1994).*
Machine generated English language translation of JP 2006-248163 (original document dated Sep. 2006).*
Machine generated English language translation of DE 2705504 (original document dated Aug. 1978).*
Machine generated English language translation of JP 2001-232693 (original document dated Aug. 2001).*
Office Action, issued in corresponding Chinese Patent Application No. 200880129537.0, from the Chinese Patent Office, dated Oct. 8, 2012, 11 pages.
International Search Report, issued in corresponding Application No. PCT/IB2008/051501, from the European Patent Office, dated Feb. 3, 2009.
Examination Report of Counterpart India Appln. No. 7298/DELNP/2010, dated Feb. 7, 2018 (5 pages).

* cited by examiner

PROCESS AND APPARATUS FOR ASSEMBLING TYRES

CROSS TO RELATED APPLICATION

This application is a divisional of application Ser. No. 13/000,599, which has a 35 U.S.C. § 371(c) date of Dec. 21, 2010, and which is an entry into the national stage under § 371 of PCT/IB2008/051501, filed Apr. 18, 2008, all of which are incorporated herein by reference.

BACKGROUND OF THE INVENTION

Field of the Invention

The present invention relates to a process and an apparatus for assembling tyres.

In more detail, the invention applies to the process and equipment used for building of a green tyre, to be subsequently submitted to a vulcanisation cycle so as to obtain the final product.

Description of the Related Art

A tyre for vehicle wheels generally comprises a carcass structure including at least one carcass ply having respectively opposite end flaps in engagement with respective annular anchoring structures integrated into the regions usually identified with the name of "beads" and having an inner diameter substantially corresponding to a so-called "fitting diameter" of the tyre on a respective rim.

Associated with the carcass structure is a belt structure comprising one or more belt layers, arranged in radially superposed relationship relative to each other and to the carcass ply, provided with textile or metallic reinforcing cords having a crossed orientation and/or disposed parallel to the circumferential extension direction of the tyre. At a radially external position to the belt structure, a tread band is applied which is also of elastomeric material like other constituent semifinished products of the tyre.

Respective sidewalls of elastomeric material are further applied, at an axially external position, to the side surfaces of the carcass structure, each extending from one of the side edges of the tread band until close to the respective annular anchoring structure to the beads. In tyres of the "tubeless" type, an airtight coating layer usually referred to as "liner" covers the inner surfaces of the tyre.

Subsequently to building of the green tyre obtained through assembly of the respective components, a vulcanisation and moulding treatment is generally carried out which aims at determining structural stabilisation of the tyre through cross-linking of the elastomeric compounds as well as at impressing it with a desired pattern and with possible graphic distinctive marks at the sidewalls.

The carcass structure and belt structure are generally made separated from each other at respective work stations, to be mutually assembled at a second time.

In more detail, manufacture of the carcass structure first contemplates application of the carcass ply or plies onto a building drum, to form a so-called substantially cylindrical "carcass sleeve". The annular anchoring structures to the beads are fitted or formed on opposite end flaps of the carcass ply or plies that are subsequently turned up around the annular structures so as to enclose them in a sort of loop.

A so-called "outer sleeve" is made on a second or auxiliary drum, said outer sleeve comprising the belt layers applied in radially superposed relationship with each other, and possibly the tread band applied at a radially external position to the belt layers. The outer sleeve is then picked up from the auxiliary drum to be coupled to the carcass sleeve. To this aim, the outer sleeve is disposed coaxially around the carcass sleeve and then the carcass ply or plies are shaped into a toroidal configuration, for example by mutual axial approaching of the beads and simultaneous admission of fluid under pressure into the carcass sleeve, so as to cause radial expansion of the carcass plies until adhesion of the latter against the inner surface of the outer sleeve.

Assembly of the carcass sleeve to the outer sleeve can be carried out on the same drum as used for making the carcass sleeve, in which case reference is made to a "unistage building process" or "unistage process".

Also known are building processes of the so-called "two-stage" type, in which a so-called "first-stage drum" is used for making the carcass sleeve, while assembly between carcass structure and outer sleeve is carried out on a so-called "second-stage sleeve" or "shaping sleeve" onto which the carcass sleeve picked up from the first-stage drum and subsequently the outer sleeve picked up from the auxiliary drum are transferred.

EP 1 312 462 discloses a building system in which a ply feeding station, a carcass building station, an assembly station and a belt building station provided with the respective drums are arranged along a production line. Transport members movable along the production line carry out transfer of the articles of manufacture under processing from a work station to another one, removing the article of manufacture from a drum and disposing it on the drum of the following station.

WO 2004/041521 in the name of the same Applicant discloses a building process in which a carcass sleeve is formed on a primary drum, while a belt structure is made on an auxiliary drum. A tread band is subsequently formed on the belt structure and afterwards the outer sleeve made up of belt structure and tread band is picked up from the auxiliary drum to be coupled to the carcass sleeve disposed on the primary drum. To this aim, a transfer ring places the outer sleeve to a coaxially centred position around the carcass sleeve, and the latter is shaped into a toroidal configuration so as to determine assembly of the same with the outer sleeve.

EP 1 481 791 discloses a tyre production system comprising a plurality of carcass building stations distributed to a predetermined mutual distance to make the carcass structures on respective carcass building drums sequentially transferred along a carcass building line. Along a belt production line formation of the belt structures equipped with the tread band is provided on respective belt building drums sequentially moved between belt building stations distributed to a predetermined mutual distance. Carcasses and belts are mutually assembled inside a vulcanisation mould.

In WO 2006/064526 in the name of the same Applicant, a substantially cylindrical carcass sleeve is provided to be made in a building station, while in a finishing station an outer sleeve is formed which is substantially cylindrical too and comprises a tread band applied at a radially external position to a belt structure. Manufacture of the outer sleeve contemplates that in a first work position of the finishing station a first belt structure is formed on a first auxiliary drum, while in a second work position of the finishing drum the tread band is applied to a second belt structure previously formed on a second auxiliary drum. The first auxiliary drum is then positioned to the second work position, while the second auxiliary drum is positioned in a grip position to be picked up by a transfer member to be transferred at a centred position around the carcass sleeve formed in the building station.

SUMMARY OF THE INVENTION

In accordance with the present invention, the Applicant has faced the problem of increasing the daily productivity for tyres different from each other in size and structure, while maintaining a high operating flexibility in the production process. More specifically, by "operating flexibility" in this context it is intended the possibility of using different elementary semifinished products for each tyre in terms of type of elastomeric material or of textile or metallic reinforcing cord.

The Applicant has ascertained that by carrying out building of the carcass sleeve and/or the outer sleeve respectively, in two or more stations, each dedicated to accomplishment of specific working steps and individually adaptable to working of different types of tyres, a reduction in the time required for completing a work cycle can be achieved and also the individual stations and therefore the plant as a whole can offer more adaptability to working of tyres of different types and sizes.

The Applicant has also found that it is possible to obtain an excellent quality of the product by carrying out perfect centring of the outer sleeve relative to the carcass sleeve and terminating assembly of the same without the carcass sleeve being removed from the building drum on which it is formed, due to use of shaping devices that can be operatively coupled to the building drum to enable shaping of the carcass sleeve in order to allow the same to be associated with the outer sleeve.

The Applicant has also perceived that for accomplishment of the above, it was necessary that the building drum and auxiliary drum could be suitably coupled to respective external transfer units capable of offering wide freedom of movement to said drums to control displacements of the same at least between the different building lines designed for formation of the carcass sleeve and outer sleeve.

The Applicant has therefore found that by installing said shaping devices in an assembly station capable of receiving the building drum and auxiliary drum from the external transfer units in order to retain them in a predetermined orientation, observance of the daily productivity and technological flexibility is achieved while at the same time the quality of the finished product can be improved.

More particularly, the following features are achieved:

centring relative to a grip unit adapted to pick up the outer sleeve from the auxiliary drum so as to subsequently position it around the carcass sleeve carried by the building drum;

efficiency in the assembly operations between the carcass sleeve and outer sleeve; and lightness and handiness of the building drum due to the shaping devices located externally of the same, which in addition results in less bulky and more reliable apparatuses.

More specifically, in a first aspect the present invention relates to a process for assembling tyres, comprising the steps of: forming a carcass sleeve on a building drum, which carcass sleeve comprises at least one carcass ply and a pair of annular anchoring structures; forming an outer sleeve on an auxiliary drum, said outer sleeve comprising at least one belt layer and a tread band; engaging the auxiliary drum on an assembly station; picking up the outer sleeve from the auxiliary drum; engaging the building drum on the assembly station; positioning the outer sleeve at a radially external position to the carcass sleeve formed on the building drum; operatively coupling shaping devices, carried by the assembly station, to the building drum; and shaping the carcass sleeve into a toroidal configuration to enable coupling of the same to said outer sleeve.

Therefore the process according to the invention allows green tyres to be obtained while maintaining the carcass structure being processed fixed on its own building drum, also with use of elementary semifinished products different from each other in a plurality of work stations, an optimal repeatability of positioning and centring between carcass sleeve and outer sleeve being ensured also at high production speeds. Thus the desired levels of quality and production flexibility are obtained without the plants' productivity being impaired.

According to relates to comprising: a further aspect, the present invention an apparatus for assembling tyres, engagement devices to be coupled to an auxiliary drum carrying an outer sleeve comprising a belt structure and a tread band, and to a building drum carrying a carcass sleeve comprising at least one carcass ply and a pair of annular anchoring structures; a grip unit for picking up the outer sleeve from the auxiliary drum coupled to the engagement devices and positioning it to a location radially external to the carcass sleeve carried by the building drum; and shaping devices to be operatively coupled to the building drum associated with the engagement devices so as to impose a radial expansion to the carcass sleeve for coupling of the same to the outer sleeve retained by the grip unit.

The present invention in at least one of said aspects, can have one or more of the preferred features hereinafter described.

Engagement of the building drum and auxiliary drum in the assembly station takes place on engagement devices operating in the assembly station and adapted to be selectively coupled to said building drum and auxiliary drum.

Preferably, said engagement takes place at least at one grip end of a central shaft carried by each of said building drum and auxiliary drum.

Thus important improvements are achieved in terms of reliability, accuracy and repeatability in positioning the carcass sleeve and outer sleeve during the assembly step.

The step of engaging the auxiliary drum on the assembly station takes place through translation of the auxiliary drum in a radial direction relative to a rotation axis thereof, so as to position it in axial alignment with a grip unit carried by the assembly station and designed to pick up the outer sleeve from the auxiliary drum.

Preferably, positioning of the auxiliary drum is controlled according to at least six movement axes.

After the outer sleeve has been picked up from the auxiliary drum and before engagement of the building drum in the assembly station, the auxiliary drum is radially moved away from an axial-alignment condition with the grip unit.

The step of engaging the building drum on the assembly station takes place through translation of the building drum in a radial direction relative to a rotation axis thereof, so as to position it in axial alignment with the grip unit.

Preferably, positioning of the building drum is controlled following at least six movement axes.

In fact, it is the Applicant's opinion that giving the building drum and auxiliary drum a wide freedom of movement in space during working along the building line brings about advantages in terms of speed and operating flexibility.

Picking up of the outer sleeve from the auxiliary drum comprises the steps of: translating the grip unit in parallel to a geometric rotation axis of the auxiliary drum until positioning the grip unit around the outer sleeve carried by the auxiliary drum; engaging the outer sleeve with the grip unit; and axially translating the auxiliary drum to release it from the outer sleeve.

The step of positioning the outer sleeve at a location radially external to the carcass sleeve takes place through translation of the grip unit in parallel to a geometric rotation axis of the building drum until positioning the outer sleeve around the carcass sleeve.

Preferably, the shaping step comprises: axially approaching the annular anchoring structures; and radially expanding said at least one carcass ply during mutual approaching of the annular anchoring structures.

Radial expansion is preferably carried out by inflation.

Preferably, the step of operatively coupling the building drum to the shaping devices comprises engagement of a pair of retaining members with the building drum, each retaining member being in axially approached relationship with one half of the building drum.

More preferably, each retaining member acts against a circumferential abutment edge carried by the building drum.

Thus said retaining members can exert an efficient sealing action during the inflation step of the carcass sleeve and/or prevent the carcass plies from slipping off the annular anchoring structures, which is an important advantage for the shaping step.

Preferably, the annular anchoring structures are locked relative to the building drum during the shaping step.

More preferably, concurrently with said locking step a hermetic seal of the carcass sleeve is carried out at the annular anchoring structures.

More particularly, said at least one retaining member is brought into thrust relationship against said at least one annular anchoring structure.

A step of locking said at least one carcass ply relative to said at least one annular anchoring structure is carried out concurrently with engagement of said at least one retaining member with the building drum.

Engagement of said at least one retaining member with the building drum comprises the steps of: fastening a flanged element of the retaining member relative to the building drum; and pushing a sealing ring of the retaining member against said circumferential abutment edge.

Fastening of the flanged element ensures an efficient contrast action of the thrusts generated during the shaping step, by effect of fluid under pressure admitted to the inside of the carcass sleeve. In turn due to the thrust of the sealing ring, locking of the carcass plies relative to the annular anchoring structures is ensured, also in the presence of plastic yielding of the elastomeric material.

After said shaping step, the following steps are carried out: disengaging the grip unit from the assembled tyre; radially contracting the building drum; and releasing the tyre being processed from the building drum.

After said shaping step, at least one step of rolling the assembled tyre carried by the building drum is also preferably executed.

Preferably, at least part of said carcass sleeve is made by laying of elementary semifinished products on the building drum.

More particularly, at least said carcass ply can be made by laying of a plurality of strip-like elements disposed in succession along the circumferential extension of an outer circumferential surface of the building drum.

Said at least one belt layer can be made by laying of elementary semifinished products on the auxiliary drum.

Preferably, a plurality of belt strip-like elements are arranged in succession along the circumferential extension of a laying surface of the auxiliary drum.

Preferably, the tread band is built on the auxiliary drum carrying said at least one belt layer, by winding at least one continuous elongated elastomeric element into coils disposed in side by side and radially superposed relationship.

Preferably, each of said building drum and auxiliary drum comprises a central shaft carrying at least one grip end to be engaged by said engagement devices.

More preferably, the grip ends of the building drum and the auxiliary drum are of mutually identical shape.

Said engagement devices comprise a mandrel to be operatively coupled at least to the central shaft of the building drum.

Preferably, at least one motor can be operatively coupled to the mandrel to drive at least the building drum in rotation.

The engagement devices further comprise a centring tip coaxially aligned with the mandrel and adapted to be operatively engaged with an end of the central shaft of the building drum, on the opposite side from said mandrel.

Preferably, at least one of said mandrel and centring tip can be further operatively coupled to the central shaft of the auxiliary drum.

Preferably, the building drum comprises two halves that can be axially approached and are each designed to engage one of said annular anchoring structures.

The building drum can further comprise a central section slidably engaging said halves and defining a central section of an outer surface of the building drum.

In this way greater engagement versatility of the drum is achieved so that the latter lends itself to be adapted to working of tyres having different sizes in terms of distance between centres of the annular anchoring structures.

The building drum comprises circumferential sectors that are radially movable between a work condition at which they extend in circumferential-continuity relationship, and a rest condition at which they are radially approached relative to a geometric axis of the building drum to enable removal, of the built tyre from the building drum.

The auxiliary drum preferably comprises circumferentially consecutive auxiliary sectors that are radially movable upon command of adjustment devices.

Preferably, each of said auxiliary sectors has comb-shaped end portions each operatively engaging a comb shaped end portion complementary thereto, carried by a circumferentially adjacent auxiliary sector.

Thus a sufficient continuity in the laying surface of the auxiliary drum is maintained also in a condition of radial expansion of the sectors thereof.

Preferably, said grip unit comprises: an annular structure movable in parallel to a geometric engagement axis of the building drum and the auxiliary drum on the engagement devices; and a plurality of plates radially movable relative to the annular structure.

Preferably, the shaping devices comprise: an actuator operating on the building drum to axially approach the annular anchoring structures; and inflating members to feed the carcass structure with working fluid during mutual approaching of the annular anchoring structures.

Said inflating members comprise a pneumatic circuit. Preferably said pneumatic circuit is connectable with a feeding duct that is partly formed in the building drum.

Preferably said feeding duct is formed in the building drum.

The shaping devices comprise retaining members acting in thrust relationship each against one of the annular anchoring structures in engagement with said at least one carcass ply.

Each of said retaining members can be operatively engaged with at least one connecting member carried by the building drum.

Each retaining member comprises at least one flanged element to be removably fastened to the building drum in axially approached relationship, and carrying at least one sealing ring designed to act against the respective annular anchoring structure.

In more detail, each retaining member carries a fastening device to be operatively coupled to said at least one connecting member.

The fastening device comprises a brake operatively mounted on a guide sleeve to be slidably engaged on said at least one connecting member.

Each of said retaining members further comprises thrust devices operating between the flanged element and sealing ring to push the latter towards the respective annular anchoring structure.

Thus an efficient hermetic seal and/or locking of the carcass ply/plies relative to the annular anchoring structures can be ensured, so that possible yielding of the raw elastomeric material forming the tyre being processed can be compensated for by the constant thrust of the sealing ring.

Said at least one sealing ring acts against the respective annular anchoring structure by a radially external frusto-conical surface of the sealing ring itself.

Said at least one sealing ring is radially expandable upon the action of the thrust devices.

Said thrust devices comprise a thrust ring axially movable towards the sealing ring upon the action of a fluid-operated actuator.

Preferably, the sealing ring has a radially internal frusto-conical surface facing a circumferential edge of the thrust ring.

Preferably, each retaining member comprises a plurality of respectively concentric sealing rings having respectively different diameters.

Thus the auxiliary shaping members are suitable for working a wide range of tyres having fitting diameters different from each other.

In addition, also preferably provided are rolling devices that are radially movable relative to the building drum associated with the engagement devices.

Said engagement devices, grip unit and shaping devices are preferably integrated into an assembly station.

Provision can be also made for a first transfer unit for the auxiliary drum to the engagement devices and a second transfer unit for the building drum to the engagement devices, wherein at least one of said first transfer unit and second transfer unit comprises at least one robotized arm.

Preferably, said robotized arm(s) comprise(s) at least six movement axes.

In a preferred embodiment, the apparatus further comprises: a carcass building line to form at least one carcass sleeve on a building drum; an outer-sleeve building line to form at least one outer sleeve on an auxiliary drum; an assembly station to couple each carcass sleeve to each outer sleeve; wherein said first transfer unit carries the auxiliary drum at least from a work station in the outer-sleeve building line to the assembly station; and wherein said second transfer unit carries the building drum at least from a work station in the carcass building line to the assembly station.

The carcass building line preferably comprises members designed to apply elementary semifinished products onto the building drum.

In more detail, the carcass building line comprises members for applying a plurality of carcass strip-like elements consecutively in succession along the circumferential extension of the outer circumferential surface of the building drum.

The outer-sleeve building line preferably comprises members for applying elementary semifinished products onto the auxiliary drum.

In more detail, said outer-sleeve building line comprises members for applying a plurality of belt strip-like elements consecutively in succession along the circumferential extension of the laying surface of the auxiliary drum.

The outer-sleeve building line further comprises: delivery members for supplying a continuous elongated elastomeric element, members for applying said continuous elongated elastomeric element so as to build said tread band by means of a plurality of coils disposed in side by side and radially superposed relationship.

Further features and advantages will become more apparent from the detailed description of a preferred, but not exclusive, embodiment of a process and an apparatus for manufacturing tyres, in accordance with the present invention.

BRIEF DESCRIPTION OF THE DRAWINGS

This description will be set out hereinafter with reference to the accompanying drawings, given by way of non-limiting example, in which.

DETAILED DESCRIPTION OF THE INVENTION

With reference to the drawings, an apparatus for building tyres for vehicle wheels designed to put into practice a process in accordance with the present invention has been generally identified by reference numeral 1.

Apparatus 1 is intended for manufacturing tyres 2 (FIG. 5) essentially comprising at least one carcass ply 3 preferably internally coated with a layer of airtight elastomeric material, or a so-called "liner" 4. Two annular anchoring structures 5 each comprising a so-called bead core 5a preferably carrying an elastomeric filler 5b at a radially external position, are in engagement with respective end flaps 3a of the carcass ply/plies 3. The annular anchoring structures 5 are integrated close to regions usually identified as "beads" 6, at which engagement between tyre 2 and a respective mounting rim (not shown) usually takes place, according to a fitting diameter determined by the inner diametrical sizes of the annular anchoring structures 5.

Figure 5:
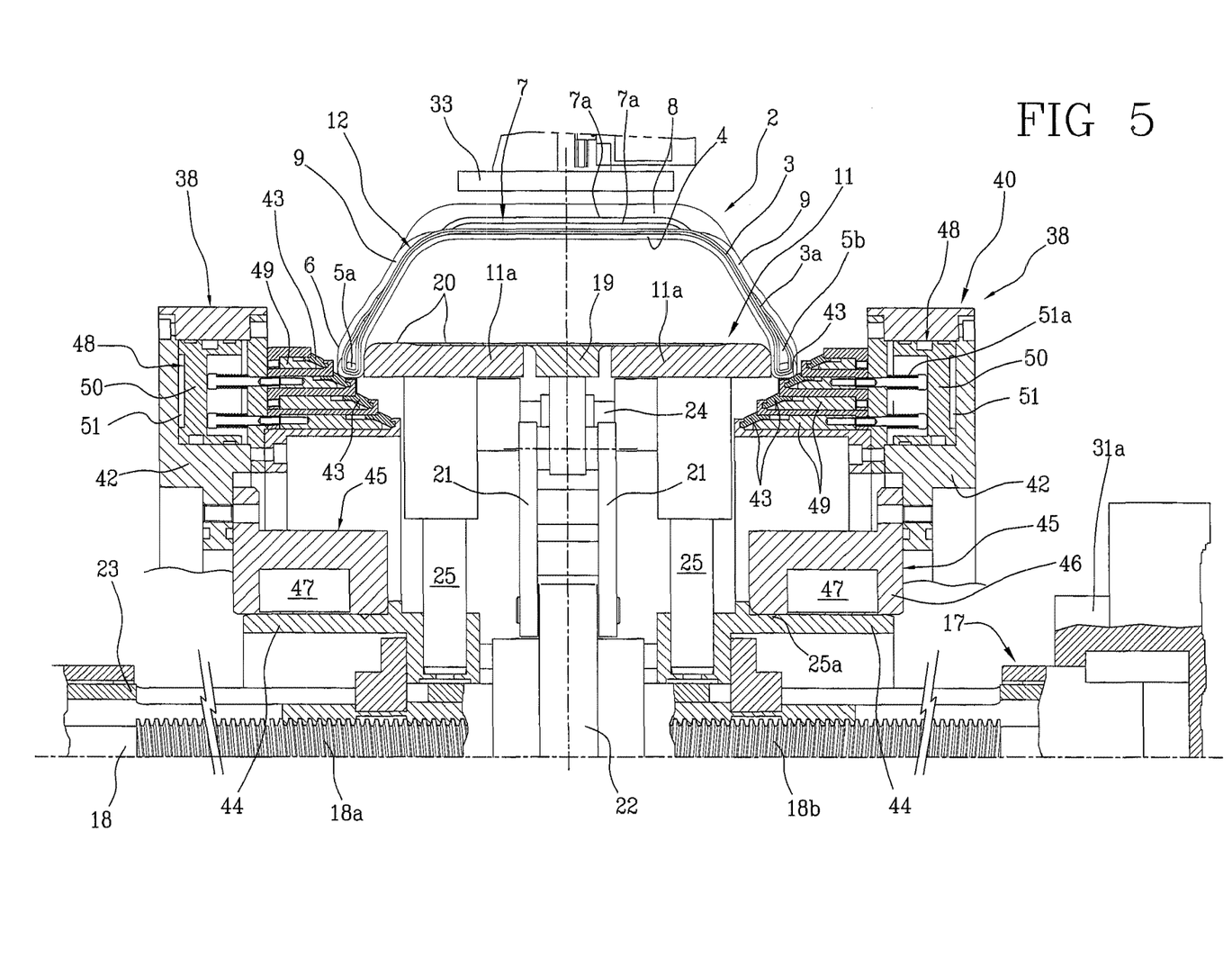
FIG. 5 shows a tyre being processed in the step during which the carcass sleeve is being shaped to be coupled to the outer sleeve.

A belt structure 7 usually comprising one or more belt layers 7a is circumferentially applied around the carcass ply/plies 3, and a tread band 8 circumferentially overlaps the belt structure 7. Two sidewalls 9, each extending from the corresponding bead 6 to a corresponding side edge of the tread band 8, are applied at laterally opposite positions onto the carcass ply/plies 3.

Figure 1:
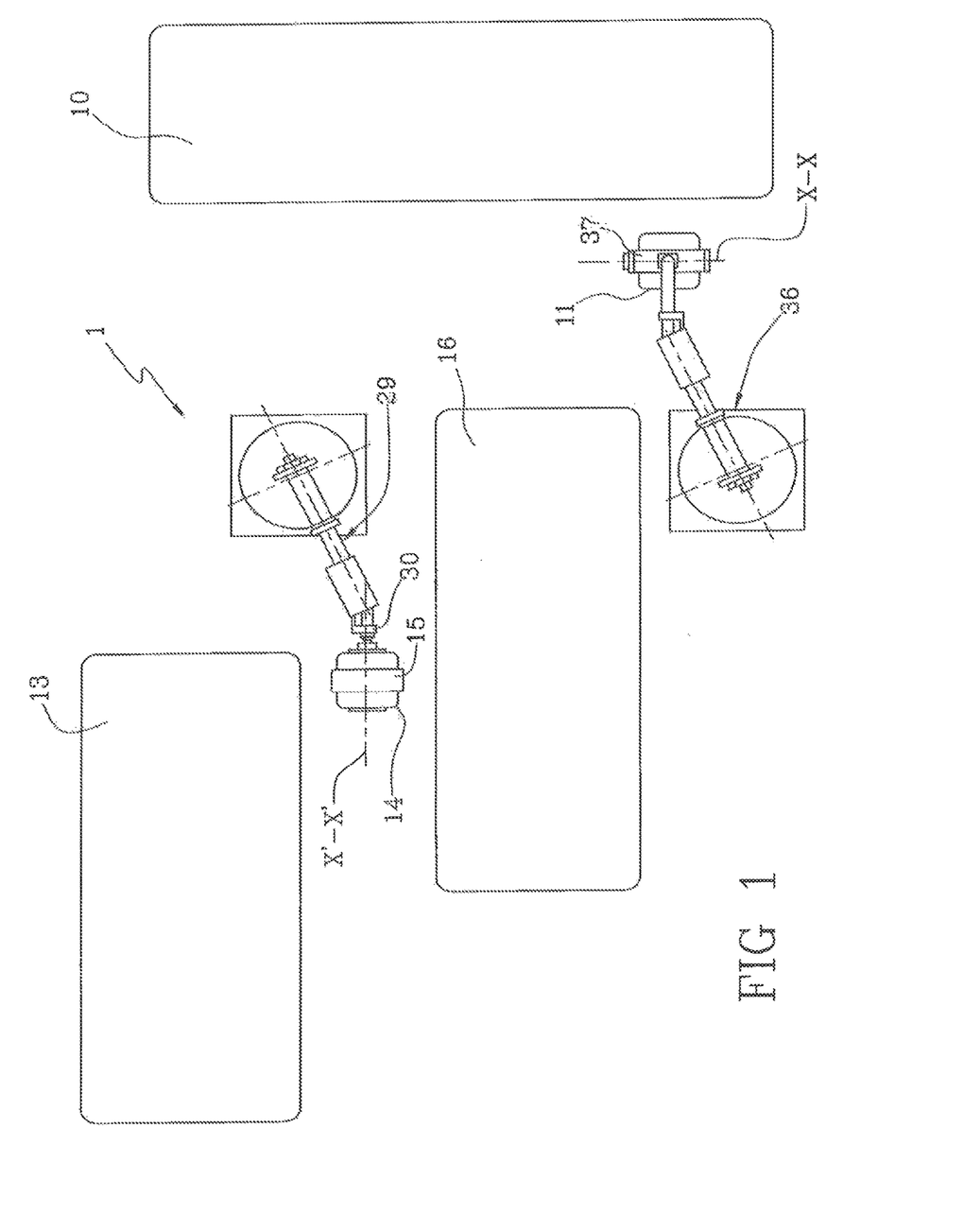
FIG. 1 is a diagrammatic top view of a plant for tyre production in accordance with the present invention.

In a preferred embodiment, diagrammatically shown by way of example in FIG. 1, apparatus 1 comprises a carcass building line, at which one or more building drums 11 are sequentially moved between different work stations (not shown) designed to form a carcass sleeve on each building drum 11, said carcass sleeve 12 comprising at least one carcass 3, liner 4, annular anchoring structures 5 and possibly at least part of sidewalls 9. Simultaneously, in an outer-sleeve building line 13, one or more auxiliary drums 14 are sequentially moved between different work stations (not shown) designed to form an outer sleeve 15 on each auxiliary drum 14, which outer sleeve 15 comprises at least the belt structure 7, tread band 8, and possibly at least part of sidewalls 9.

Figure 2:
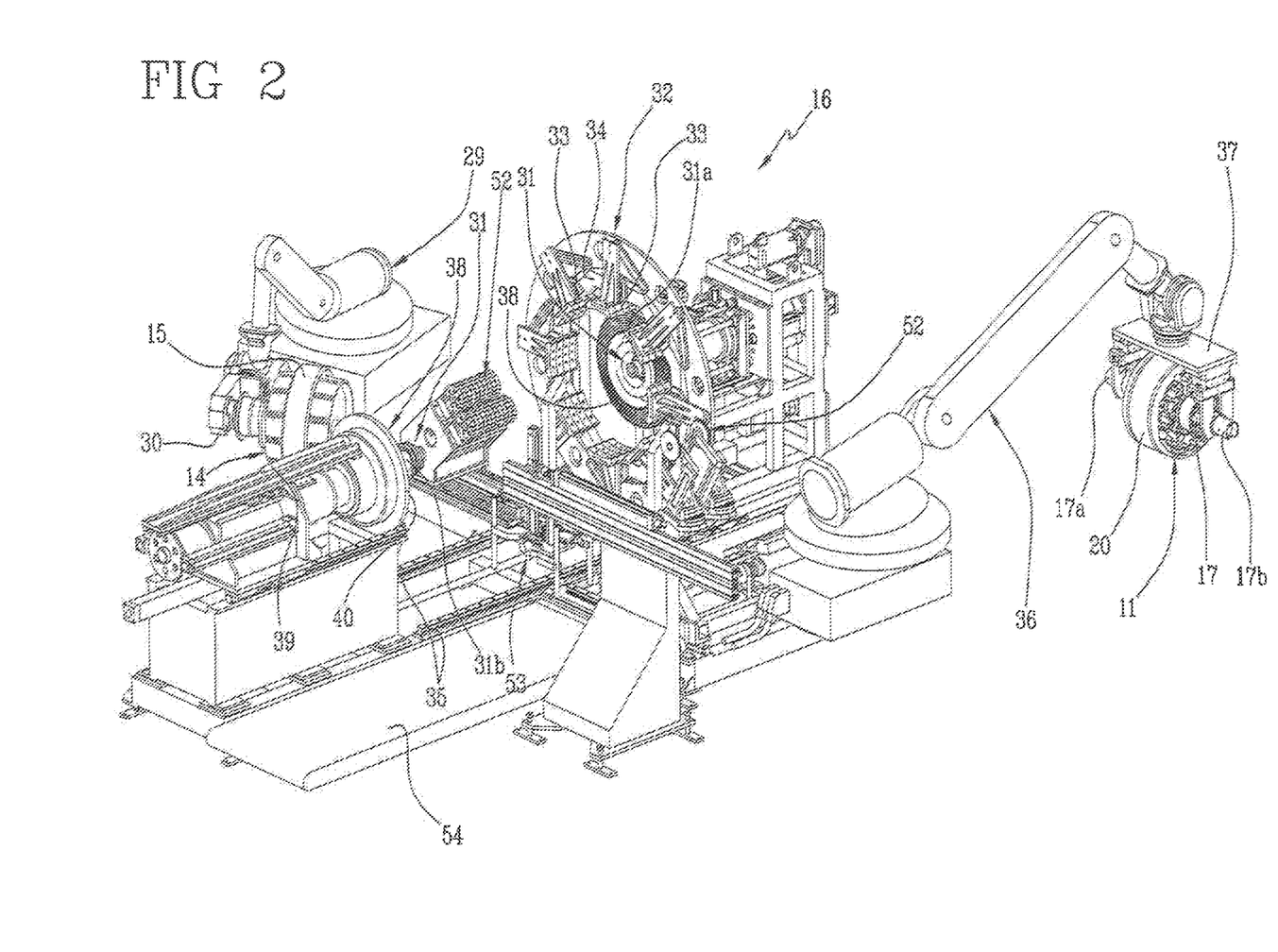
FIG. 2 is a perspective view of an assembly station being part of an apparatus in accordance with the invention.

Apparatus 1 further comprises an assembly station 16, better shown in FIG. 2, at which the outer sleeve 15 is removed from the auxiliary drum 14 to be coupled to the carcass sleeve 12 formed on the building drum 11.

In more detail, the building drum 11 has two halves 11a borne by a first central shaft 17 extending along a geometric axis X-X of the building drum. Halves 11a can be axially approached, upon command of the threaded bar for example, which is operatively disposed within the first central shaft 17 and carries two threaded portions 18a, 18b, a right-handed portion and a left-handed portion respectively, each engaging one of halves 11a. Halves 11a of the building drum 11 are consequently induced to simultaneously translate in respectively opposite directions along the first central shaft 17, following rotations imparted to the threaded bar 18.

The building drum 11 can further comprise a central section 19 slidably engaging halves 11a and extending in a surface-continuity relationship relative to the same so as to define therewith, at a radially external position, a substantially continuous outer surface 20.

Each of halves 11a and the central section 19 are made up of respective circumferential sectors, radially movable between a rest condition (not shown) at which they are disposed radially close to the geometric axis "X-X" to give the building drum 11a diametrical bulkiness smaller than the fitting diameter of the tyre being processed, in order to allow removal of tyre 2 being processed from the building drum 11, and a work condition at which, as shown in the figures, they extend in circumferential continuity relationship so as to form said outer surface 20 having a diameter preferably greater than the fitting diameter.

In the embodiment shown, radial movement of the circumferential sectors is carried out through a plurality of connecting rods 21 each secured between one of the sectors of the central section 19 of the building drum 11 and a drive collar 22 rotatably carried by the first central shaft 17 and drivable in angular rotation by a tubular sleeve 23 housed within the first central shaft 17 itself. Transmission bars 24 axially extending through the sectors of the central section 19, transmit the radial movements of said sectors to the circumferential sectors of the axially opposite halves 11a of the building drum 11, slidably guided along respective columns 25 radially extending relative to the first central shaft 17.

The first central shaft 17 has a connecting terminal 17a that can be operatively engaged by at least one robotized arm or other transfer devices to be sequentially moved between said work stations located along the carcass building line 10.

At least one of the work stations located on the carcass building line 10 can for example comprise one or more delivery devices feeding at least one continuous elongated element of elastomeric material while the building drum 11 is being driven in rotation around its geometric axis X-X, so as to form the above mentioned liner 4 on the outer surface 20 and/or on possible auxiliary support elements (not shown) that can be removably coupled in a continuity relationship with the same outer surface, at locations axially opposite to the building drum 11. In addition or as an alternative to liner 4, abrasion-proof inserts to be incorporated at beads 6 can also be formed and/or, in case of tyres of the so-called run-flat type, auxiliary support inserts (referred to as sidewall inserts) which are applied to the respective halves 11a of the building drum 11, so as to be then incorporated into tyre 2 at the sidewall 9 region.

After formation of the above mentioned parts, application devices not shown as they can be made in any convenient manner, apply the carcass ply/plies 3 around the outer surface 20. Each carcass ply 3 can consist of an article of manufacture in the form of a continuous strip previously cut to the circumferential extension of the outer surface 20 and delivered towards the latter, while the building drum 11 is rotating about its geometric axis X-X, so as to cause winding of the same around the outer surface 20.

In a preferred embodiment, at least the carcass ply/plies 3 and/or other parts of tyre 2 are made by laying of elementary semifinished products. To the aims of the present invention, "elementary semifinished products" as herein employed means continuous elongated elements of elastomeric material, textile and/or metallic rubberised cords, strip-like elements. It is to be pointed out that in the present description by "strip-like element" it is intended a belt of elastomeric material cut to size and comprising one or more textile or metallic reinforcing cords. These elementary semifinished products are suitable for use in an appropriate amount so as to compose one or more of the above described elements constituting the tyre, without storage of semifinished products being required.

To this aim, the application devices comprise members for sequentially applying a plurality of strip-like elements disposed transversely relative to the circumferential extension of the outer surface 20, while the building drum 11 is being driven in rotation with a stepping movement, in the same manner as described in document U.S. Pat. No. 6,328,084 for example, in the name of the same Applicant.

The carcass ply/plies 3 are then preferably directly formed on the building drum 11, by application of the strip-like elements in mutually approached relationship, so as to cover the whole circumferential extension of the outer surface 20.

Preferably, the outer surface 20 has an axial size smaller than the width of said at least one carcass ply 3, so that the end flaps 3a of the carcass ply/plies 3 disposed on the building drum 11 axially project from the opposite ends of the outer surface 20.

Locating members not shown as they can be made in a manner known by itself carry out fitting of each of the annular anchoring structures 5 coaxially around one of the end flaps 3a of the carcass ply/plies 3 folded over towards the geometric axis X-X, and placement of said structure in axial abutment relationship against the corresponding half of the building drum 11.

When placement has been completed, turning-up members turn each of the end flaps 3a around the respective annular anchoring structure 5, so as to stabilize engagement of the same with the carcass ply/plies 3 thereby giving rise to formation of said carcass sleeve 12.

When engagement of the annular anchoring structures 5 has been completed or concurrently with this operating step, application of sidewalls 9 can take place.

Figure 3:
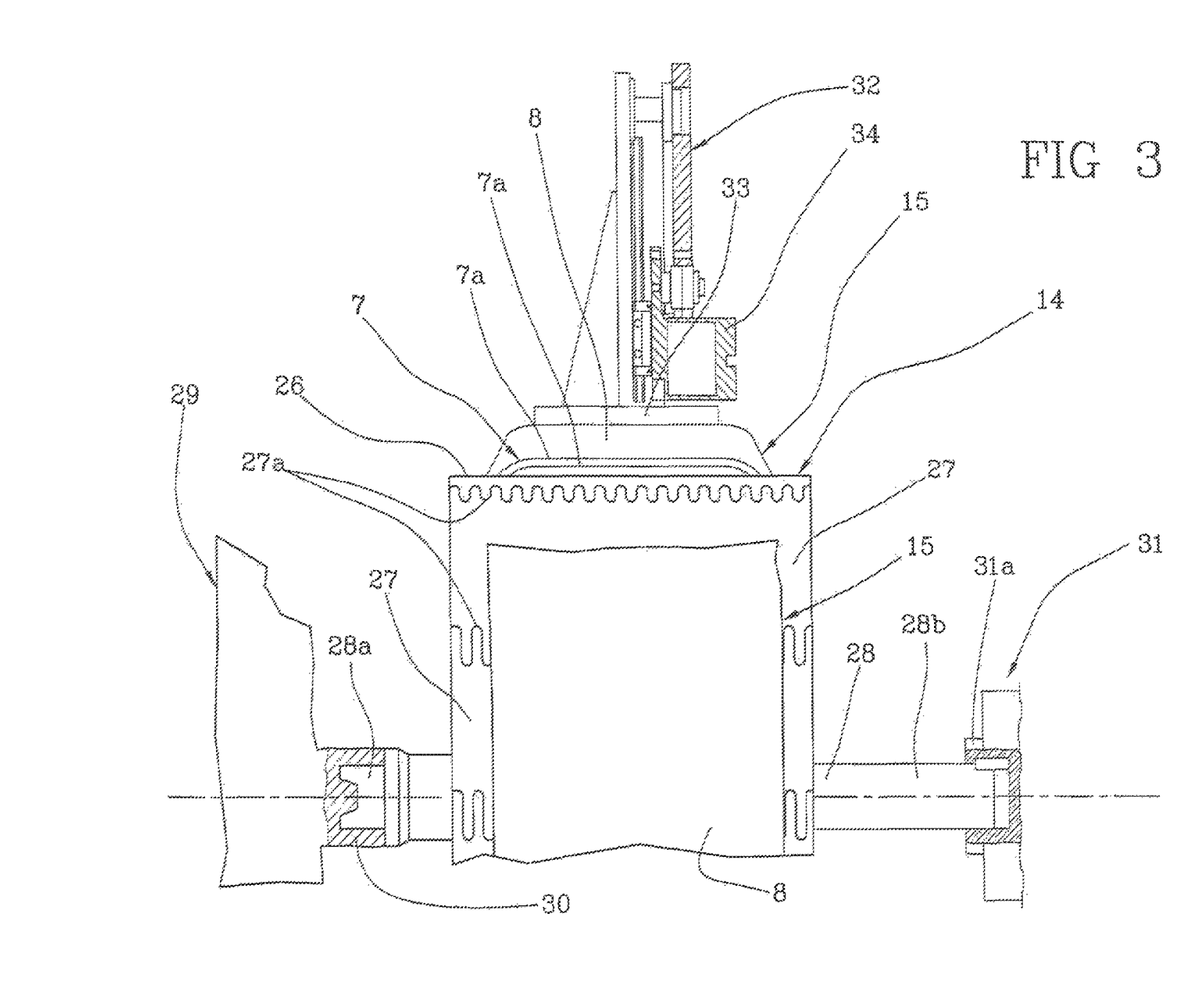
FIG. 3 diagrammatically shows in diametrical section, an outer sleeve in an engagement step of the same by a grip unit associated with the assembly station.

As better shown in FIG. 3, the auxiliary drum 14 is externally provided with a substantially cylindrical laying surface 26 defined by a plurality of auxiliary sectors 27 disposed consecutively around a geometric symmetry axis X'-X' of the auxiliary drum. The auxiliary sectors 27 can be simultaneously submitted to radial translation upon command of the adjustment devices, not shown, drivable through a second central shaft 28 carrying a respective connecting terminal 28a.

Preferably, each auxiliary sector 27 has comb-shaped end portions 27a each of which operatively engages a comb-shaped end portion 27a complementary thereto, carried by a circumferentially adjacent auxiliary sector 27.

Through at least one robotized arm or other handling devices operating on the connecting terminal 28a of the second central shaft 26, the auxiliary drum 14 is adapted to be moved and conveniently driven close to different work stations located along the outer-sleeve building line 13.

Radial mobility of the auxiliary sectors 27 allows the diametrical sizes of the auxiliary drum 14 to be varied, starting from a minimum diameter until reaching a diameter suitable for manufacturing outer sleeves 15 in compliance with the design specifications. In the condition of minimum diameter, the auxiliary sectors 27 can act mutually in abutment by means of respective circumferential shoulders present thereon at the comb-shaped ends 27a, so as to give the laying surface 26 a continuous extension, adapted to allow formation of parts of elastomeric material of the outer sleeve 15, such as an under-belt insert, through laying of at least one continuous elongated element of elastomeric material wound up into coils disposed consecutively close to each other.

When manufacture of the under-belt insert has been completed, the auxiliary sectors 27 can be radially expanded until giving the laying surface 26, and the under-belt insert formed thereon, a diameter suitable for formation of the belt layers 7a and/or other parts of the outer sleeve 15. Due to the presence of the comb-shaped end portions 27a the laying surface 26 can keep its substantially cylindrical conformation and a substantially continuous extension, i.e. without the presence of important discontinuities, even after radial expansion of the auxiliary drum 14.

Due to the absence of important discontinuities on the laying surface 26, correct formation of the different parts of the outer sleeve 15 is facilitated, above all when, as provided by a preferred embodiment, at least the belt layer or layers 7a and/or other parts of the outer sleeve 15 are made by laying of strip-like elements or other elementary semi-finished products on the auxiliary drum 14.

When formation of the belt structure 7 is over, building of the tread band 8 takes place by means of delivery members supplying a continuous elongated elastomeric element applied in the form of coils disposed in side by side or radially superposed relationship on the belt structure 7 carried by the auxiliary drum 14, while the latter is being driven in rotation.

When building of the outer sleeve 15 has been completed a first transfer unit 29 carries out transfer of the auxiliary drum 14 to the assembly station 16.

This first transfer unit 29 preferably comprises a robotized arm, preferably an anthropomorphous robot with six or more (preferably seven) movement axes, having a head 30 that can be operatively coupled to the connecting terminal 28a of the second central shaft 28. Preferably the first transfer unit 29 is also entrusted with the task of supporting the auxiliary drum 14 in the outer-sleeve building line 13, and conveniently moving it between at least the last work station provided along said line and said assembly station 16. Said first transfer unit 29 can also carry out operation of said devices for adjustment of the diameter of the laying surface 26.

Transfer of the auxiliary drum 14 to the assembly station 16 takes place through translation of the drum itself in a direction radial to its geometric rotation axis X'-X', so as to align its geometric rotation axis with engagement devices 31 installed on the assembly station and preferably comprising a mandrel 31a. Then, by axial movement of the auxiliary drum 14 or by axial movement of the mandrel 31a, the mandrel 31a is coupled to a grip end 28b of the second central shaft 28, while the connecting terminal 28a placed on the opposite side from the grip end 28b is still retained by the first transfer unit 29.

The auxiliary drum 14 that has been hitherto borne by a system offering freedom of movement according to six or more axes and represented by the first transfer unit 29, is thus efficiently immobilised in a unique and precise positioning within the assembly station 16.

In more detail, the auxiliary drum 14 appears to be coaxially in alignment with a grip unit 32 adapted to pick up the outer sleeve 15 from the auxiliary drum 14, by a plurality of circumferentially distributed plates that are radially movable relative to an annular support structure 34.

The annular support structure 34 is axially movable along respective guides 35 integral with the assembly station 16, so as to bring plates 33 to an axially centred position relative to the mid-line axis of the outer sleeve 15. Plates 33 are then simultaneously radially approached relative to the auxiliary drum 14, until they come into contact with the outer sleeve 15.

Suitable actuators housed in the head 30 of the first transfer unit 29 operate radial contraction of the auxiliary sectors 27, through the connecting terminal 28a of the second central shaft 28, so as to disengage the auxiliary drum 14 from the 5 outer sleeve 15 retained by plates 33 of the grip unit 32.

Then by the first transfer unit 29 the auxiliary drum is axially slipped off the outer sleeve 15 that remains in engagement with the grip unit 32, and thereafter the auxiliary drum 14 can be radially moved apart from its axial alignment with the grip unit 32 to be used again for manufacturing a new outer sleeve 15 along the outer-sleeve building line 13.

A second transfer unit 36, preferably comprising a robotized arm with six or more (preferably seven) movement axes having a fork-shaped terminal 37 that can be operatively coupled to the opposite ends of the first central shaft 17, picks up the building drum 11 from the carcass building line 10 and couples it to the engagement devices 31 in place of the auxiliary drum 14 previously removed from said devices. The second transfer unit 36 itself can also be entrusted with the task of supporting the building drum 11 in the carcass building line 4-310, and conveniently moving it between at least the last work station provided along the building line itself and the assembly station 16.

Transfer of the building drum 11 to the assembly station 16 takes place through translation of the drum in a radial direction relative to its geometric rotation axis X-X, so as to align it with mandrel 31a. A grip end 17b of the first central shaft 17, may be engaged following axial movement of the building drum 11 or by axial movement of mandrel 31*a* itself.

A centring tip 31*b* provided in the assembly station 16 in axial alignment with mandrel 31*a*, is axially moved close to the latter for engaging the first central shaft 17, on the opposite side from mandrel 31*a*. The fork-shaped terminal 37 of the second transfer unit 36 can therefore be released from the building drum 11 and moved away from the assembly station 16.

The building drum 11, previously borne and moved by a system offering freedom of movement according to six or more axes and represented by the second transfer unit 36, is now efficiently immobilised at a unique and precise positioning (more specifically to a degree of freedom, i.e. rotation relative to axis X-X) within the assembly station 16, between mandrel 31*a* and centring tip 31*b*, in axially aligned relationship with the grip unit 32 carrying the outer sleeve 15.

Use of the same engagement devices 31 for engagement both of the auxiliary drum 14 and the building drum 11 on the assembly station 16 promotes an excellent uniqueness and repeatability of positioning of the articles of manufacture inside the assembly station. To this aim, it is desirable for the grip ends 17*b*, 28*b* of the building drum 11 and auxiliary drum 14 to have a mutually identical shape.

By new movements of the grip unit 32 along guides 35, in parallel to the geometric rotation axis X-X of the building drum, the outer sleeve 15 is located at an axially centred position relative to the mid-line axis of the carcass sleeve 12 carried by the building drum 11.

Shaping devices 38 installed on the assembly station 16 are then operatively coupled to the building drum 11 so as to shape the carcass sleeve 12 into a toroidal configuration (FIG. 5), in order to cause application of the same against a radially internal surface of the outer sleeve 15.

The shaping devices 38 may for example comprise an actuator (not shown) operatively associated with mandrel 31*a* for driving the threaded bar 18 in rotation so as to cause mutual axial approaching of halves 11*a* of the building drum 11 and, consequently of the annular anchoring structures 5 of the carcass sleeve 12. Preferably, the shaping devices 38 further comprise inflating members having a pneumatic circuit connected to feeding duct 39, which is partly formed in the building drum 11 and for example opening along the first central shaft 17 in order to feed the carcass sleeve 12 with a working fluid and cause radial expansion of the same by inflation, during mutual approaching of the annular anchoring structures 5.

Figure 4:
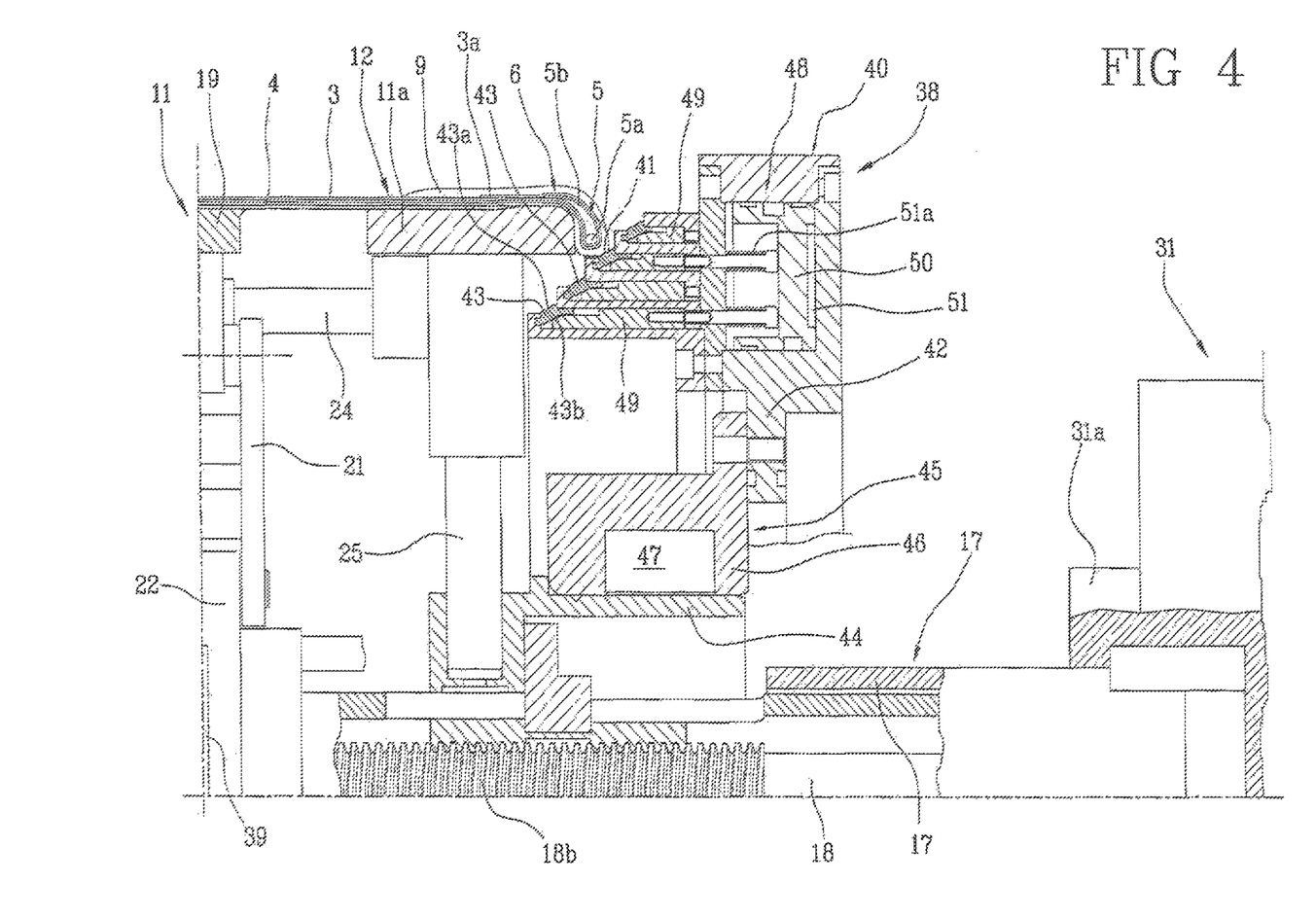
FIG. 4 diagrammatically shows in diametrical section, a carcass sleeve in an engagement step of the beads by retaining members associated with the assembly station.

Then operative engagement of the building drum 11 takes place with at least one retaining member 40 adapted to be integrated with the shaping devices 38 to enable execution of the step of shaping the carcass sleeve 12. In more detail, in a preferred embodiment, the building drum 11 is operatively engaged with at least one pair of retaining members 40, each in axially approached relationship with one of said halves 11*a*. The retaining members 40 are adapted to act each against a circumferential abutment edge 41 carried by the building drum 11, to enable toroidal conformation of the carcass ply/plies 3 concurrently with mutual approaching of halves 11*a*.

In more detail, each retaining member 40 lends itself to act in thrust relationship against one of the annular anchoring structures 5 each defining one of said circumferential abutment edges 41 to keep beads 6 against the building drum 11 and/or lock the carcass ply/plies 3 relative to the annular anchoring structures 5 during the shaping step, so as to avoid undesirable sliding of the carcass ply/plies or any other undesirable deformation in the region of beads 6 during radial expansion of the carcass sleeve 12.

Each retaining member 40 preferably comprises at least one flanged element 42 that can be removably fastened axially close to the respective half 11*a* of the building drum 11 and carries at least one sealing ring designed to act against the respective annular anchoring structure 5 carried by the building drum 11.

More particularly, a plurality of respectively concentric sealing rings 43 having respectively different diameters can be advantageously associated with each retaining member 40. Thus it is advantageously, possible to use the same retaining members 40 for processing a wide variety of tyres having different fitting diameters.

The retaining members 40 can be removably coupled to respective connecting members 44 of the building drum 11, by a fastening device 45 operatively carried by the flanged element 42. This fastening device 45 preferably comprises a guide sleeve 46 to be slidably engaged on the respective connecting member 44 and with which a brake 47 preferably of the hydraulic or pneumatic type, not described in detail as it can be made in any convenient manner, is integrated. After the retaining members have been fitted each on the respective connecting member 44 and axially shifted until bringing one of the respective sealing rings 43 against the annular anchoring structure 5 of the carcass sleeve 12, brakes 47 are driven to cause steady axial anchoring of the retaining members 40 relative to the building drum.

Preferably, each sealing ring 43 acts against the respective annular anchoring structure 5 by a radially external frusto-conical surface 43*a* of the sealing ring 43 itself. The sealing ring 43 can thus exert a thrust action against the carcass ply/plies 3 turned up around the annular anchoring structure 5, which thrust action is concentrated along a radially internal circumferential edge of said annular anchoring structure 5. Said thrust action appears to be particularly adapted to avoid undesirable sliding of the cords forming the carcass ply/plies 3 by effect of stresses transmitted during the shaping step.

At the same time, the sealing rings 43 preferably having a continuous circumferential extension, perform the function of sealingly closing the carcass sleeve 12 at the annular anchoring structures 5, facilitating radial expansion of the carcass sleeve and maintenance of the inflated condition following the shaping step.

The Applicant has further noticed that the thrust action exerted by the sealing rings 43 could however decrease during the shaping step, due to typical yielding of the raw elastomeric material.

Therefore, it is preferably provided that each retaining member 40 should further comprise thrust devices 48 operating between the respective flanged element 42 and the sealing rings 43 to enable the sealing ring 43 acting against the respective anchoring structure 5 to be maintained in thrust relationship against the latter during the whole shaping step of the carcass sleeve 12. In this manner, arising of sliding phenomena of the cords of the carcass ply/plies 3 turned up around the annular anchoring structures 5 are avoided also in the presence of plastic yielding of the elastomeric material disposed close to beads 6.

According to a preferred embodiment, the thrust devices 48 comprise at least one thrust ring 49 slidably in engagement with the flanged element 42 and axially movable towards the sealing ring 43 upon the action of a fluid-operated actuator 50.

More particularly, a plurality of thrust rings 49 each of them associated with one of the sealing rings 43 is preferably provided. Each sealing ring 43 is radially expandable by effect of axial movement of the respective thrust ring 49. To facilitate this radial expansion, each sealing ring 43 can have a radially internal frustoconical surface 43b facing a circumferential edge of the thrust ring 49.

Advantageously, a single fluid-operated actuator 50 comprising an annular piston for example that is pushed by air or other fluid under pressure admitted to a chamber 51 formed in the flanged element 42, can simultaneously act on all thrust rings 49 associated with the respective retaining member 40, overcoming the action of respective return springs 51a. The thrust action however will only act on the sealing ring 43 operating in abutment against the annular anchoring structure 5.

In conclusion, during the whole shaping step, the action of brakes 47 on the respective connecting members 44 ensures steady positioning of the retaining members 40, and efficiently counteracts the important stresses tending to axially move them away from the building drum 11, by effect of the inflating pressure created within the carcass sleeve 12. At the same time, the thrust devices 48 make sure that, in spite of the axial locking carried out by brakes 47, the sealing rings 43 are constantly maintained in thrust relationship against the annular anchoring structures 5, also in the presence of plastic yielding of the elastomer is material.

At the end of the shaping step, brakes 47 can be deactivated to enable the retaining members 40 to be axially slipped off the building drum 11.

In addition, rolling devices 52 radially movable relative to the building drum 11 can be also associated with the assembly station 16. In a known manner, the rolling devices 52 after release of the grip unit 32 from the assembled tyre, carry out a rolling operation on the tread band 8 and on at least part of sidewalls 9 while the tyre being processed is being driven in rotation by a motor (not shown) associated with mandrel 31a, to ensure a reliable application of the outer sleeve 15 to the carcass sleeve 12.

When building has been completed, the sectors of the building drum 11 are radially contracted towards the inside to enable removal of tyre 2 from the building drum 11, upon the action of a grip and deposit unit 53 unloading the tyre on a conveyor belt 54. Tyre 2 is then moved away from the assembly station 16 to be submitted to a vulcanisation step, to be done in any convenient manner.

The invention claimed is:

1. An apparatus for assembling tyres, comprising:
    engagement devices, wherein said engagement devices are a mandrel and a centring tip, the centring tip being configured to couple to an auxiliary drum carrying an outer sleeve comprising a belt structure and a tread band, and both the mandrel and the centring tip being configured to couple to a building drum carrying a carcass sleeve comprising at least one carcass ply and a pair of annular anchoring structures;
    a first robotic arm with at least six axes of movement configured to transfer the auxiliary drum to the engagement devices;
    a second robotic arm with at least six axes of movement configured to transfer the building drum to the engagement devices;
    a grip unit comprising an annular structure and a plurality of moveable plates, the grip unit being configured to pick up the outer sleeve from the auxiliary drum while the auxiliary drum is coupled to the engagement devices and to position the outer sleeve in a location radially external to the carcass sleeve carried by the building drum;
    shaping devices capable of being operatively coupled to the building drum while the building drum is engaged on the engagement devices so as to impose a radial expansion to the carcass sleeve for coupling of the carcass sleeve to the outer sleeve while the outer sleeve is retained by the grip unit; and
    wherein the shaping devices include:
        a pair of retaining members, each retaining member being configured to act in thrust relationship against a respective one of said annular anchoring structures, each retaining member comprising a plurality of concentric sealing rings and a plurality of thrust rings with each thrust ring being associated with a respective one of the sealing rings, wherein each sealing ring has a respective radially internal frustoconical surface and each sealing ring is radially expandable by axial movement of its respective thrust ring against its radially internal surface;
        an approaching actuator configured to operate on the building drum to cause the annular anchoring structures to mutually approach one another along an axial direction of the building drum; and
        inflating members comprising a pneumatic circuit and configured to feed the carcass sleeve with working fluid during mutual approaching of the annular anchoring structures.

2. The apparatus as claimed in claim 1, wherein each of said building drum and auxiliary drum comprises a central shaft carrying at least one grip end capable of being engaged by a respective one of said engagement devices.

3. The apparatus as claimed in claim 2, wherein the grip ends of the building drum and the auxiliary drum are of mutually identical shape.

4. The apparatus as claimed in claim 1, wherein the building drum comprises circumferential sectors that are radially movable between a work condition at which the circumferential sectors extend in circumferential-continuity relationship and a rest condition at which they are radially approached relative to a rotation axis of the building drum to enable removal of a tyre from the building drum.

5. The apparatus as claimed in claim 1, wherein said annular structure of the grip unit is movable in parallel to a rotation axis of the building drum when the building drum is engaged by said engagement devices; and said plurality of plates are radially movable relative to the annular structure.

6. The apparatus as claimed in claim 1, wherein said inflating members comprise a feeding duct.

7. The apparatus as claimed in claim 1, further comprising rollers.

8. The apparatus as claimed in claim 1, further comprising:
    an assembly station that includes said engagement devices, said grip unit and said shaping devices.

9. The apparatus as claimed in claim 8, further comprising:
    a carcass building line to form the carcass sleeve on the building drum;
    an outer-sleeve building line to form the outer sleeve on the auxiliary drum; and
    wherein said assembly station is capable of coupling the carcass sleeve to the outer sleeve,
    wherein said first robotic arm is capable of carrying the auxiliary drum from a work station in the outer-sleeve building line to the assembly station; and wherein said second robotic arm is capable of carrying the building drum from a work station in the carcass building line to the assembly station.

\* \* \* \* \*